US 6,532,551 B1

(12) United States Patent
Kamei et al.

(10) Patent No.: US 6,532,551 B1
(45) Date of Patent: Mar. 11, 2003

(54) DATA MANAGEMENT METHOD FOR BACKUP MEMORY

(75) Inventors: Naoyuki Kamei, Ikoma-gun (JP); Masakazu Suzuki, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/569,424

(22) Filed: May 12, 2000

(30) Foreign Application Priority Data

May 14, 1999 (JP) ............................................ 11-134484

(51) Int. Cl.[7] .................................................. H02H 3/05
(52) U.S. Cl. ............................................. 714/13; 714/7
(58) Field of Search ............................. 714/13, 5, 6, 7, 714/8, 11, 12, 42, 54, 702, 710, 718, 719; 711/5, 103, 133, 134, 162, 161, 221

(56) References Cited

U.S. PATENT DOCUMENTS 5,473,776 A * 12/1995 Nosaki et al. .............. 707/200
5,546,534 A * 8/1996 Malcolm ........................ 714/6
5,857,208 A * 1/1999 Ofek ........................... 707/204
6,038,665 A * 3/2000 Bolt et al. .................... 713/176
6,098,155 A * 8/2000 Chong, Jr. ................... 711/138
6,438,666 B2 * 8/2002 Cassagnol et al. ........... 711/163

FOREIGN PATENT DOCUMENTS

JP  7-323617   12/1995

* cited by examiner

Primary Examiner—Dieu-Minh Le
(74) Attorney, Agent, or Firm—Dike, Bronstein, Roberts & Cushman IP Group; David G. Conlin; David A. Tucker (57) ABSTRACT

A backup memory has a plural number of pages (e.g., page 0, page 1 . . . ) including machine-status data. Each page stores machine-status data such as the number of prints, machine usage information data, machine condition data, accounting information data, etc. The machine-status data has a HEAD portion and a DATA portion including DATA0, DATA1 and DATA2. The HEAD portion designates the latest written position of the above three pieces of DATA portion. For example, if data is last written into DATA2 in the DATA portion, the HEAD portion should take a value of 3. The DATA portions are interrelated to each other.

11 Claims, 9 Drawing Sheets

DATA MANAGEMENT METHOD FOR BACKUP MEMORY

BACKGROUND OF THE INVENTION

(1) Field of the Invention

The present invention relates to a data storage management method for backup memory to be used for, for example, copiers, facsimile machines and multi-functional machines using electrophotography, and in particular relates to a data management method for improving the reliability of the machine-status data stored in the backup memory in the above various image forming apparatus.

(2) Description of the Prior Art

Conventionally, in the backup memory that stores machine-status data in an image forming apparatus, data rewrite etc., are performed based on the data which has been once input. Examples of important machine-status data concerning an image forming apparatus include the total copy/print number, the number of times the photosensitive member has been used. With the increasing development of networking environments, it becomes necessary to know and check the machine-status data for individual users, that is, the usage state including the total print number of an individual user, in order to enhance the accounting system. With this tendency, it becomes more necessary to improve the reliability of the backup data held in the backup memory.

As a storage management method for a backup memory needing rewriting, Japanese Patent Application Laid-Open Hei 7 No. 323617 discloses a method in which a controller analyzes the print data having been input, determines whether a rearranging process needs to be done for the memory, compares the data in a permanent memory controller with the data in the memory when it has been determined that the rearrangement should be done, and reenters that data into a permanent memory. For such backup memory, flash EEPROMs have recently come to be used more frequently.

However, the technique disclosed in Japanese Patent Application Laid-Open Hei 7 No. 323617 not only needs complicated control for data rewriting but also there is doubt about the reliability of the loaded data.

SUMMARY OF THE INVENTION

In order to solve the above problem, it is an object of the present invention to provide a data management method for backup memory wherein if an anomaly data value is found in the processing, the data value is made invalid or subjected to a predetermined process to thereby improve the reliability of the backup memory.

In order to achieve the above object, the present invention is configured as follows:

In accordance with the first feature of the present invention, a data management method for backup memory storing machine-status data for use in an image forming apparatus comprising the steps of: determining a first interrelation between a first machine-status data stored most lately in a first storage area and machine-status data stored in storage area other than the first storage area when the machine-status data in a predetermined plural number of storage areas in the memory is renewed in a sequential order; determining a renewal machine-status data based on the first machine-status data if the first interrelation satisfies a predetermined condition; and storing the renewal machine-status data in the storage area to be renewed.

In accordance with the second feature of the present invention, the data management method for backup memory having the above first feature is characterized in that the backup memory employs flash ROMs or EEPROMs.

In accordance with the third feature of the present invention, the data management method for backup memory having the above first feature is characterized in that the machine-status data is renewed when each portion associated with machine-status data provided in the image forming apparatus starts or ends its operation.

In accordance with the fourth feature of the present invention, the data management method for backup memory having the above first feature is characterized in that the backup memory has two types, master and slave memories so as to perform dual storage of the same machine-status data.

In accordance with the fifth feature of the present invention, the data management method for backup memory having the above first feature, further includes the steps of: determining that an anomaly is occurring in the first storage area when the first interrelation does not satisfy the predetermined condition; further determining the first interrelation of between a second machine-status data stored in second storage area before the first machine-status data is stored in the first storage area and machine-status data stored in storage area other than the first and second storage areas; determining a renewal machine-status data based on the second machine-status data if the first interrelation satisfies a predetermined condition; and storing the renewal machine-status data in the storage area to be renewed.

In accordance with the sixth feature of the present invention, the data management method for backup memory having the above fourth feature, further includes the steps of: loading a corresponding first interrelation from a counterpart storage area on the slave backup memory side when the first interrelation related to the storage area on the master backup memory side does not satisfy the predetermined condition; determining a renewal machine-status data based on a renewal relation information relating to renewal of machine-status data and storing the renewal machine-status data into storage area to be renewed on the master side if the first interrelation on the slave side also does not satisfy the predetermined condition; and swapping the master side and the slave side in the backup memory when the first interrelation on the slave side satisfies the predetermined condition.

In accordance with the seventh feature of the present invention, the data management method for backup memory having the above fifth feature, further includes the step of: correcting the first machine-status data based on the second machine-status data when it is found that the first interrelation does not satisfy the predetermined condition.

In accordance with the eighth feature of the present invention, the data management method for backup memory having the above fifth or sixth feature is characterized in that even when it is found that the first interrelation does not satisfy the predetermined condition, the first machine-status data that does not satisfy the first interrelation will not be corrected as long as the first machine-status data does not need to be corrected.

In accordance with the ninth feature of the present invention, the data management method for backup memory having the above fifth or sixth feature, further includes the step of: switching the predetermined plural number of storage area to another predetermined plural number of storage area when the first interrelation does not satisfy the predetermined condition.

In accordance with the tenth feature of the present invention, the data management method for backup memory having the above ninth feature further includes the steps of: when swapping of the storage areas has been repeated, a predetermined number of times during a predetermined period of time, or when swapping of the storage areas has been repeated to a predetermined number of times, informing the user of the current situation through a display member; saving the machine-status data in the backup memory, into a separate, recovery backup memory; initializing the backup memory; and recovering the backup memory using the machine-status data stored in the recovery backup memory.

In accordance with the eleventh feature of the present invention, the data management method for backup memory having the above tenth feature, further includes the steps of: when the initialization of the backup memory and the following recovery operation of the backup memory using the recovery backup memory have been repeated, a predetermined number of times during a predetermined period of time, or when the initialization of the backup memory and the following recovery operation has been repeated to a predetermined number of times, stopping the operation of the machine; and informing the user of the current situation through the display member.

BRIEF DESCRIPTION OF THE DRAWINGS

FIG. 3 is a flowchart showing the procedural steps of operation of the apparatus when the apparatus is turned on;

FIG. 4 is a flowchart showing the procedural steps of operation following the flowchart shown in FIG. 3 when the apparatus is turned on;

FIG. 5 is a flowchart showing the procedural steps operation when the machine-status data as to the number of prints is renewed after the apparatus has been turned on;

FIG. 8 is a flowchart showing the procedural steps of operation following the flowchart shown in FIG. 5 when the machine-status data as to the number of prints is renewed after the apparatus has been turned on.

DESCRIPTION OF THE PREFERRED EMBODIMENT

The embodiments of the present invention will be described with reference to the accompanying drawings. However, it should be noted that the present.invention is not limited to the embodiment hereinbelow. In this embodiment, description will be made as to the backup memory that stores data and description of operations of the other portions will be omitted.

Figure 1:
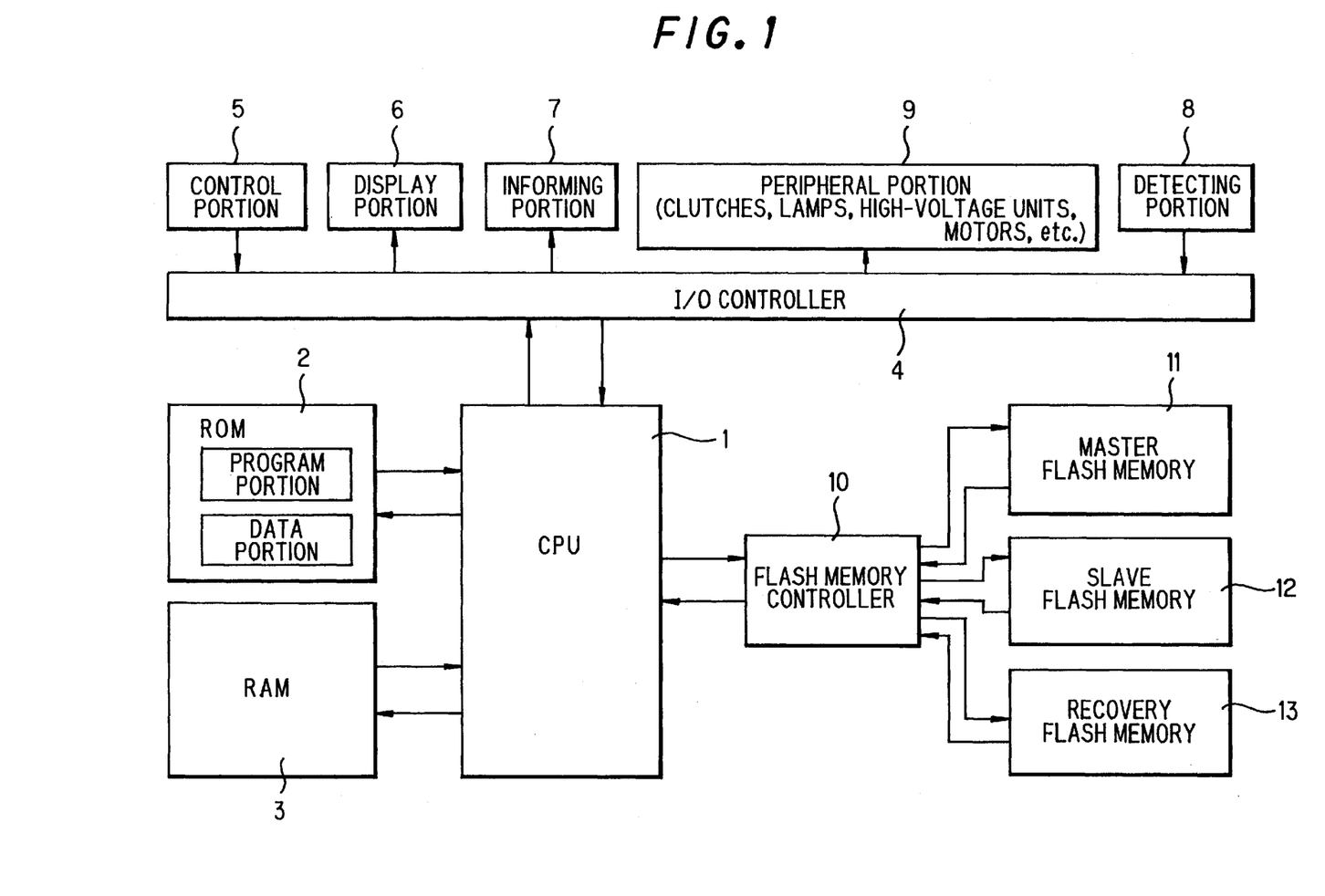
FIG. 1 is a block diagram showing one embodiment of a multi-functional machine in accordance with the present invention.

FIG. 1 is a block diagram showing one embodiment of a multi-functional machine in accordance with the present invention. This multi-functional machine can be used as a copier, printer, facsimile machine. The multi-functional machine includes a CPU 1 for controlling an aftermentioned ROM and various controllers etc.; a ROM 2 for storage of a series of programs and system data; a RAM 3 as a stack required during the processing of a program; an I/O controller 4 for controlling data exchange between CPU 1 and an aftermentioned display portion etc.; a control portion 5 allowing for the user to control the apparatus; a display portion 6 for displaying the control indications to the user when the user operates the apparatus; an informing portion 7 such as a buzzer etc., which gives instructions and the operation status information etc., to the user by auditory effects; a detecting portion 8 configured of sensors etc., which detect the variations of different units and variations in environment; a peripheral portion 9 generally including motors, high-voltage units, etc.; a flash memory controller 10 for controlling flash memories mentioned below; a master flash memory 11 as a main memory for backup memory; a slave flash memory 12 as an auxiliary memory for backup memory; and a recovery flash memory 13 to be used for recovery of backup memory. These three backup memories are set up interchangeably by flash memory controller 10.

The data stored in the aforementioned master flash memory 11 is also stored in salve flash memory 12 in a dual manner, to improve the reliability of the data held inside the backup memory. Further, through detailed later, since this configuration assumes occurrences of contradictions between the dual records of information in the backup memory due to a hardware defect of the backup memory or any other defect and takes countermeasures against this, so that it is possible to improve the reliability of the data in the backup memory. For the backup memory, a flash EEPROM, for example, can be used so as to improve the reliability at low costs.

Examples of information allotted in the backup memory may include data of the total number of prints as copier, printer and facsimile machine, the information indicating the maintenance timings of the photosensitive member and the developer, the information indicate set conditions of the optical system process conditions ,fixing conditions and the like relating to the various machine conditions, and the information about the usage status of the apparatus relating to the accounting system which is especially important if the apparatus is a network printer, lease product, or the like. Here, the information as to all the devices constituting the multi-functional machine will be called machine-status data. Since the multi-functional machines are continuously making remarkable progress, a variety of unpredictable machine-status data will become needed in the future.

The timing when each piece of machine-status data needs to be renewed differs depending upon the type of the machine-status data. For example, machine-status data such as the tonal number of prints which is incremented when printing of a sheet is effected should be renewed at the timing of activation or deactivation of detecting portion 8 or peripheral portion 9 including clutches, lamps, high-voltage power units, motors, etc.

The information as to the usage state for the accounting system and the like should be renewed only when the power source to the apparatus is turned on. In this way, the timing is individually set up depending upon the kind of machine-status data and is stored into ROM 2 or RAM 3, so that CPU 1 will effect a different transaction following the associated algorithm.

Next, the configuration of the storage portion of the backup memory and machine-status data to be stored therein will be described.

Figure 2:
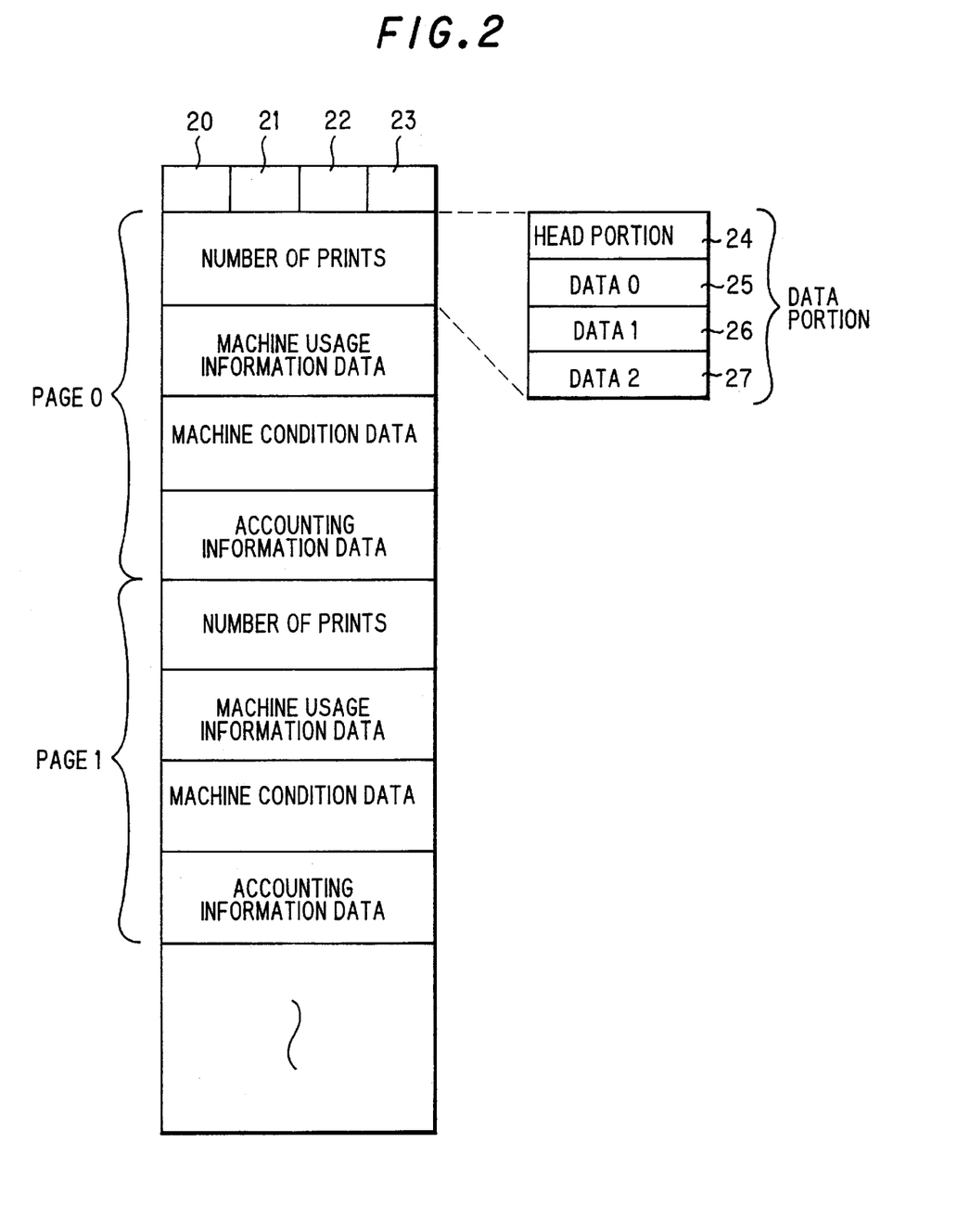
FIG. 2 is an illustrative view showing a backup memory configuration.

FIG. 2 is an illustrative view showing the structure of each of master flash memory 11, slave flash memory 12 and recovery flash memory 13 constituting the backup memory shown in FIG. 1. Usage of the components will be described hereinbelow.

The area of a master/slave value 20 consists of one bit or more and takes a value of either 0 or 1. Master/slave value 20 of master flash memory 11 or slave flash memory 12 is set at 0 if it is currently functioning as the master, whereas the value is set at 1 if it is functioning as the slave. Reading master/slave value 20 of a backup memory provides the knowledge as to which the backup memory is functioning as either the master or the slave (to be written as master/slave hereinbelow). Further, this area is also used for setting a value when the backup memory is subjected to a recovery process. This will be described later.

Designated at 21 is an area for counting the number of recovery operations, for storing the number of times the recovery process has been performed, which will be described later. An area 22 is for the number of swaps, for storing the number of times swapping between the master and slave in the backup memory has been effected, which will be described later. An area 23 is to indicate the information of page position in the backup memory, which will be described later.

For storing machine-status data a plurality of page, such as page 0, page 1 as shown in FIG. 2 are allotted. Each page stores a set of machine-status data including the number of prints, machine usage information data, machine condition data, accounting information data and the like. Each piece of machine-status data is composed of a HEAD portion 24 and a DATA portion including DATA0-25, DATA1-26 and DATA2-27.

HEAD portion 24 stores a parameter (renewal relation information) which may determine which data position among the above three data position DATA0-25 to DATA2-27 has been last written in. For example, if data has been last written into DATA2-27 in the DATA portion, the HEAD portion should take a value of 3. The values in the DATA portion are interrelated to each other. This will be detailed below.

In the present embodiment, it is assumed that the machine-status data is sequentially written into DATA0-25, DATA1-26 and DATA2-27 in their renewal order, and the value is successively incremented.

In the above configuration, a series of steps of renewing the machine-status data in the backup memory (DATA0-25 to DATA2-27) will be described with reference to the flowcharts shown in FIGS. 3 to 5 and FIGS. 7 to 9 and the diagram of the data structure shown in FIG. 6.

Example 1 illustrates a typical case of the machine operation in the early stages after the first operation or the machine operation until master/slave swapping occurs. Example 2 illustrates a case where master/slave swapping in the backup memory occurs due to a certain anomaly during renewal of machine-status data in the backup memory. Example 3 illustrates a case where the machine is restarted when the user shut down the apparatus during the recovery process for the backup memory which had been effected due to frequent occurrences of master/slave swapping in the backup memory.

EXAMPLE 1

The procedural steps of operation shown in FIG. 3 after the apparatus has been turned on will be described hereinbelow.

At STEP 301, CPU 1 loads the master/slave value 20 from recovery flash memory 13 by way of flash memory controller 10 and checks the value at STEP 302 so as to judge whether recovery flash memory 13 is master/slave.

If the master/slave value is 0, which indicates that recovery flash memory 13 is master, the operation goes to STEP 303. Otherwise the operation goes to STEP340 (FIG. 4). Since this example is based on the assumption of a normal case such as the initial stage of the machine operation in the early stages and the operation until master/slave swapping occurs, the operation goes to STEP303.

At STEP303, CPU 1 loads the master/slave value 20 from master flash memory 11 and checks the value at STEP 304 so as to confirm if the master flash memory 11 is set in the master state. If the master/slave value is 0, which indicates that master flash memory 11 is the master, the operation goes to STEP 305. Otherwise the operation goes to STEP310 (FIG. 4). Since this example is based on the assumption of a normal case, the operation goes to STEP305.

In Example 1, no master/slave swapping is performed so that a variable SWAP is set at 0 at STEP 305. Therefore, the operation goes to STEP 307 upon the judgement as to variable SWAP at STEP 306.

At STEP 307, CPU 1 sets up a master data address table which contains the addresses of machine-status data (HEAD portion and DATA portion) in master flash memory 11.

At STEP 308, CPU 1 sets up a slave data address table which contains the addresses of machine-status data (HEAD portion and DATA portion) in slave flash memory 12.

This master data address table and slave data address table are used when the values of machine-status data in master flash memory 11 and slave flash memory 12 are incremented, and these tables aim at simplifying the data handling after master/slave swapping.

By the above procedures, the master data address table and slave data address table including variables are set up and will be used to perform addressing when machine-status data is renewed later.

Figure 5:
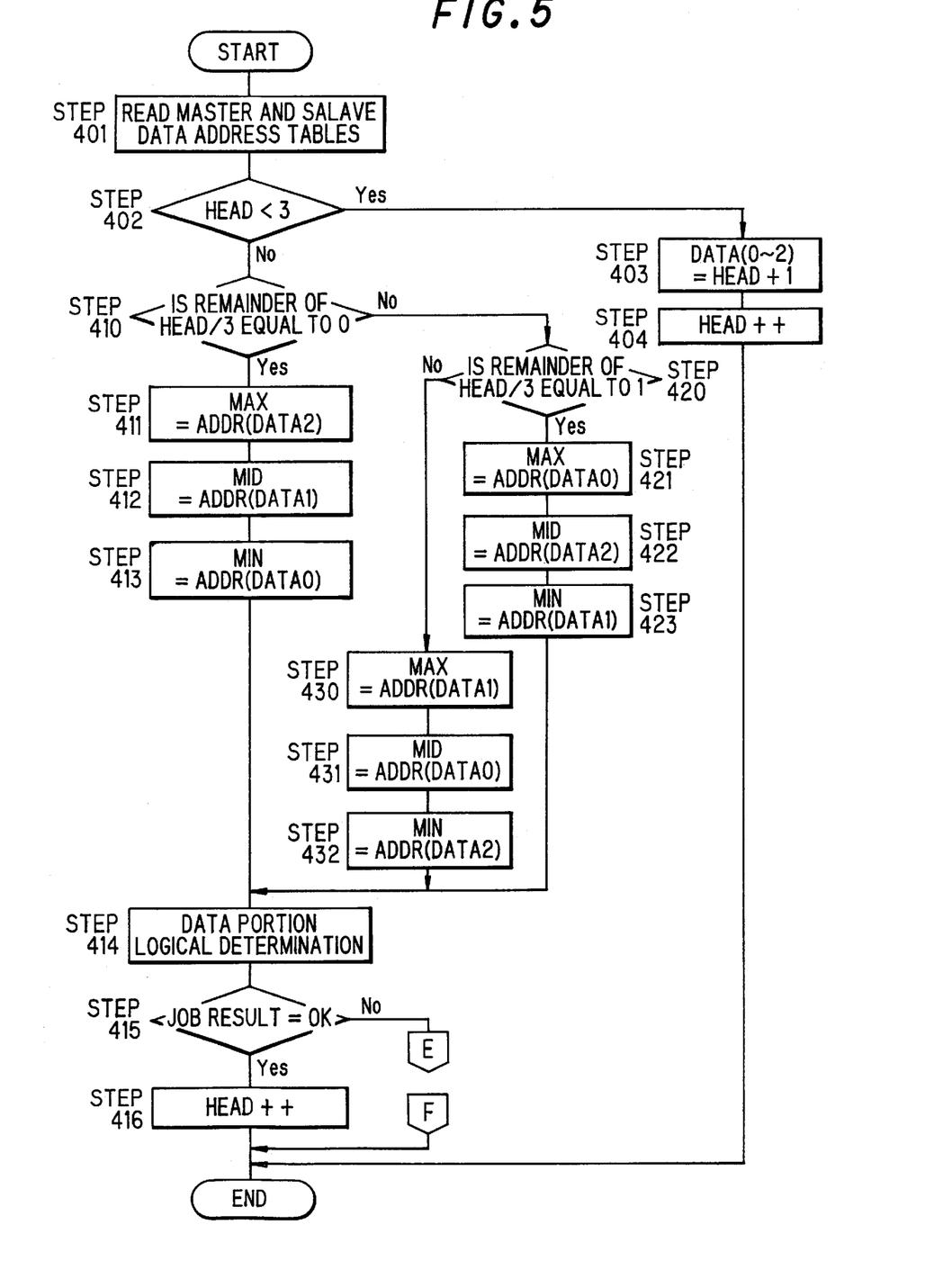
Figure 6:
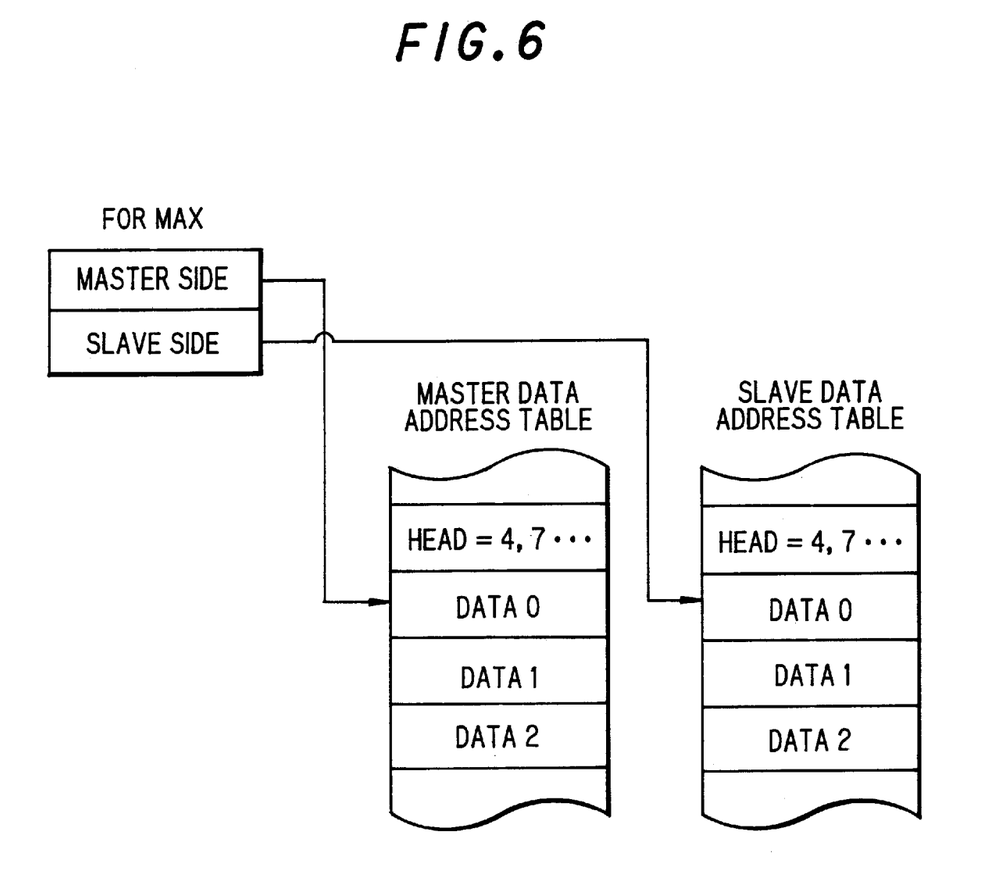
FIG. 6 is a diagram showing a data configuration of a variable MAX.

Referring next to FIG. 5, the procedural steps of operation when the machine-status data as to the number of prints is renewed after the machine has been turned on.

At STEP 401, CPU 1 reads the number of prints (the data value) from the HEAD portion 24 through the master data address table and checks the data value at STEP 402, STEP 410 and STEP 420 to perform a different transaction depending upon the determination.

First, the data value in HEAD portion 24 falls within [0] to [2], the operation goes to STEP 403 where a different operation as follows is effected depending upon the data value.

When the data value in HEAD portion 24 is [0], for example, this is the number of prints which indicates the first operation of the machine for printing etc. Therefore no data value is set up in DATA portion 25–27 and no address value is set up in the master data address table. Hence, in this first operation case, the data value in HEAD portion 24 is incremented to be [1] and the incremented value [1] is set into DATA0-25 only in the data portion.

Next, when the data value of HEAD portion 24 is [1], this is the number of prints which indicates the second operation of the machine for printing etc. Therefore only DATA0-25 in the DATA portion holds its value. Hence, in this case, the data value in HEAD portion 24 is incremented to be [2] and the incremented value [2] is set into DATA0-26 only.

Then, when the data value of HEAD portion 24 is [2], this is the number of prints which indicates the third operation of the machine for printing etc. Therefore the portions other than DATA2-27 in the DATA portion hold their values. Hence, in this case, the data value in HEAD portion 24 is incremented to be [3] and the incremented value [3] is set into DATA2-27 only.

At STEP 404, the data value in HEAD portion 24 is incremented and the operation is ended.

At STEP 410 and STEP 420 for handling the cases where the data value in HEAD portion 24 has a value other than [0] to [2], the data value in HEAD portion 24 is divided by 3 to determine the remainder, based on which the positions of the maximum value (the latest data), the medium value (the second latest data) and the minimum value (the third latest data) in the DATA portion can be determined.

For example, if the data value in HEAD portion 24 is a multiple of 3, e.g., 3, 6, etc., the operation goes to STEP 411.

At STEPs 411 to 413, variables MAX, MID and MIN are sequentially set up with the addresses of DATA2, DATA1 and DATA0, stored in the master and slave data address tables, relating to the number of prints, respectively.

On the other hand, if the remainder when the data value in HEAD portion 24 is divided by 3 is equal to 1 (e.g., [4], [7]), the operation goes to STEP 421. At STEPs 421 to 423, the aforementioned variables MAX, MID and MIN are sequentially set with the addresses of DATA0, DATA2 and DATA1, stored in the master and slave data address tables, relating to the number of prints, respectively.

In the remaining case where the remainder when the data value in HEAD portion 24 is divided by 3 is equal to 2 (e.g., [5], [8], etc.,), the operation goes to STEP 430. At STEPs 430 to 432, the aforementioned variables MAX, MID and MIN are sequentially set with the addresses of DATA1, DATA0 and DATA2, stored in the master and slave data address tables, relating to the number of prints, respectively.

The aforementioned variables MAX, MID and MIN are set with the addresses in the master and slave data address tables, of the DATA portion relating to the number of prints. In connection with this, FIG. 6 shows an example where the data value in HEAD portion 24 is 4, that is, MAX is the address of DATA0.

At STEP 414, a DATA portion logical determination subroutine relating to the set variables MAX, MID and MIN is performed. That is, the operation goes to STEP 501 in FIG. 7.

Figure 7:
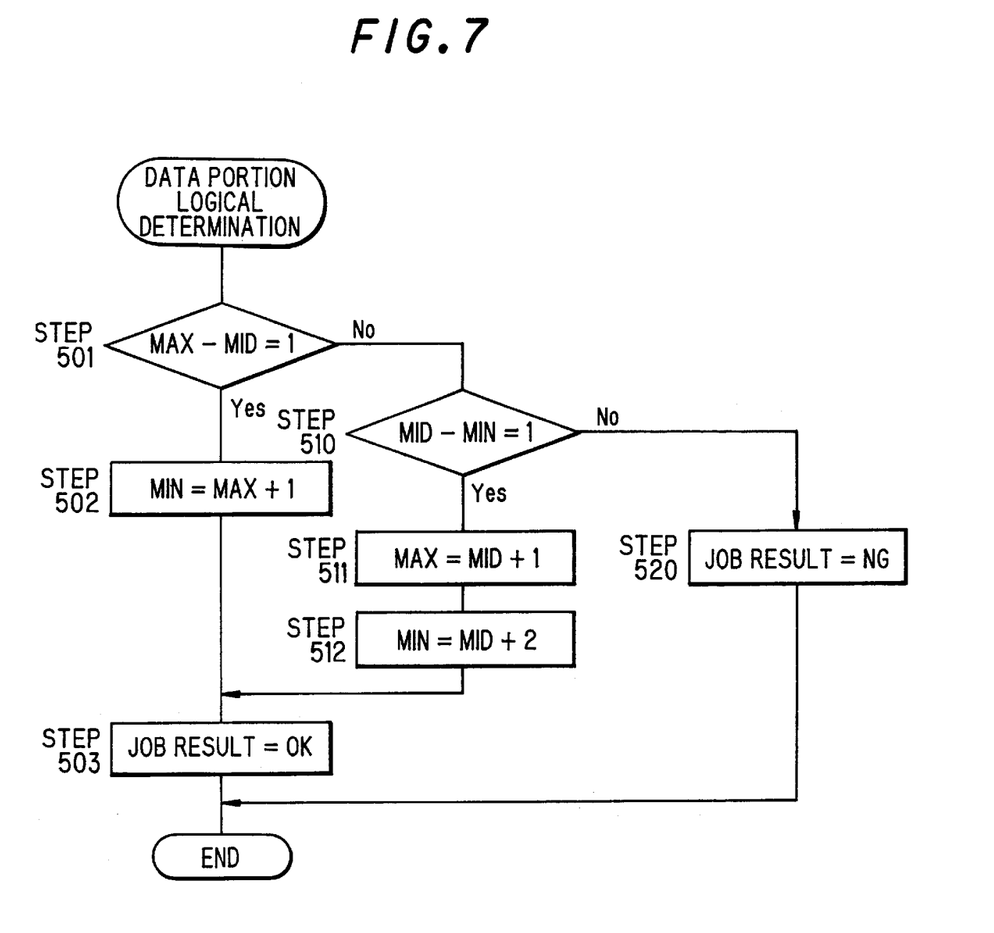
FIG. 7 is a flowchart for analyzing the interrelation of data in the backup memory.

In the flow shown in FIG. 7, the interrelation of the DATA portion, related to the master data address table, corresponding to the variables MAX, MID and MIN set up by the flow shown in FIG. 5, is checked. If there is no problem with the relationship, the machine-status data is renewed. In this embodiment, the address interval in the DATA portion related to in the master data address table is set at 1. For example, if the data value of the DATA portion, on the master side, designated by the variable MAX is [5], the data value on the variable MID side should be [4] and the data value on the variable MIN side should be [3].

In the above flow, at STEP 501 it is judged whether the difference of the data value in the DATA portion, related to the master data address table, designated by the variable MAX from the data value in the DATA portion, related to the master data address table, designated by the variable MID is equal to [1].

When the result of the judgement is affirmative, i.e., the difference is equal to [1], the data value in the DATA portion, related to the master and slave address tables, designated by the variable MAX are incremented and the incremented value is set as the data value in the DATA portions, related to the master data address table, designated by the variable MIN, at STEP 502. Then the operation goes to STEP 503. Otherwise, the operation goes to STEP510. In this example, the data value in the DATA portion, related to the master data address table, designated by the variable MAX is assumed to be incorrect, so that the operation goes to STEP 510.

At STEP 510 it is judged whether the difference of the data value in the DATA portion, related to the master data address table, designated by the variable MID from the data value in the DATA portion, related to the master data address table, designated by the variable MIN is equal to [1].

When the result of the judgement is negative, i.e., the difference is not equal to [1], the operation goes to STEP 520 where the job result is determined to be NG and the job is ended. When the determined result is equal to [1], the operation goes to STEP 511. In this example, the data values in the DATA portion, related to the master data address table, designated by the variables MID and MIN are assumed to be normal so that the operation goes to STEP 511. The process going to STEP 520 will be shown in Example 2.

At STEP 511, the data value in the DATA portion, related to the master address table, designated by the variable MID is incremented and the incremented value is set as the data value in the DATA portions, related to the master and slave data address tables, designated by the variable MAX. Thereby, the DATA portion, related to the master and slave data address tables, designated by the variable MAX, which have been determined to be incorrect at STEP 501, are corrected.

Execution of STEP 511 can prevent anomaly processing from occurring at STEP 501 and STEP 510 when the machine-status data is renewed in a similar manner in the next cycle of operation. If STEP511 is not effected, the operation will go from STEP 501 to STEP 510 and further enter STEP 520 in the next cycle and hence an aftermentioned recovery process of the backup memory should be effected. Therefore, it should be understood that when the data value in the DATA portions, related to the master and slave data address tables, designated by the variable MAX are incorrect, they need to be corrected based on the other associated data value in the DATA portion.

In contrast, when only the data value in the DATA portion, related to the master and slave data address tables, designated by the variable MIN, is incorrect, the process is ended without the necessity of correcting them as long as the difference between the data value in the DATA portion, related to the master data address table, designated by the variable MAX and the data value in the DATA portion, related to the master data address table, designated by the variable MID is equal to [1] at STEP 501. In the above way, the data value in the DATA portion, related to the master data address table should be interrelated to each other, but all the values in the DATA portion should not be correctly related to each other. That is, as long as normal operation is allowed between the necessary values in the DATA portion, unnecessary steps can be omitted thus making it possible to reduce the number of processing steps and hence improve the processing capacity of the apparatus.

At STEP512, the data value in the DATA portion designated by the variable MID, related to the master data address table, is increased by 2 and this increased renewal value is set as the data value in the DATA portions, related to the master and slave data address tables, designated by the variable MIN, and the operation goes to STEP 503. At STEP 503, the job result is determined to be OK and the process shown in FIG. 7 is ended. Then the operation goes to STEP415 (FIG. 5).

At STEP 415, it is judged whether the job result as the return value from the DATA portion logical determination subroutine is OK. If the judgement is affirmative, the operation goes to STEP 416 (FIG. 5). Otherwise, the operation goes to STEP 440. This example assumes that the operation proceeds keeping away from STEP 520 where the job result is set to be NG. So the operation goes to STEP 416, at which HEAD portions 24, related to the master and slave data address tables, designated by a variable HEAD are incremented to complete a series of processing shown in FIG. 5.

By the above procedural steps of operation, the minimum value in the DATA portion based on each of the master and slave data address table is replaced by the maximum value while the value in the HEAD portion 24 is incremented. Thus, it is possible to renew the machine-status data whilst maintaining the interrelation between the addresses corresponding to the DATA portions used by each master and slave data address table.

EXAMPLE 2

This example shows a case where master/slave swapping in the backup memory occurred due to a certain anomaly while the machine was operated and then the machine has been restarted.

Referring first to FIG. 4, a series of procedures to deal with a case where the machine-status data in backup memory 11 presents an incorrect value when the number of prints in the machine-status data is renewed after the apparatus has been turned on. Here, description as to the steps up to the execution of STEP 414 is omitted because they are the same as Example 1.

Figure 8:
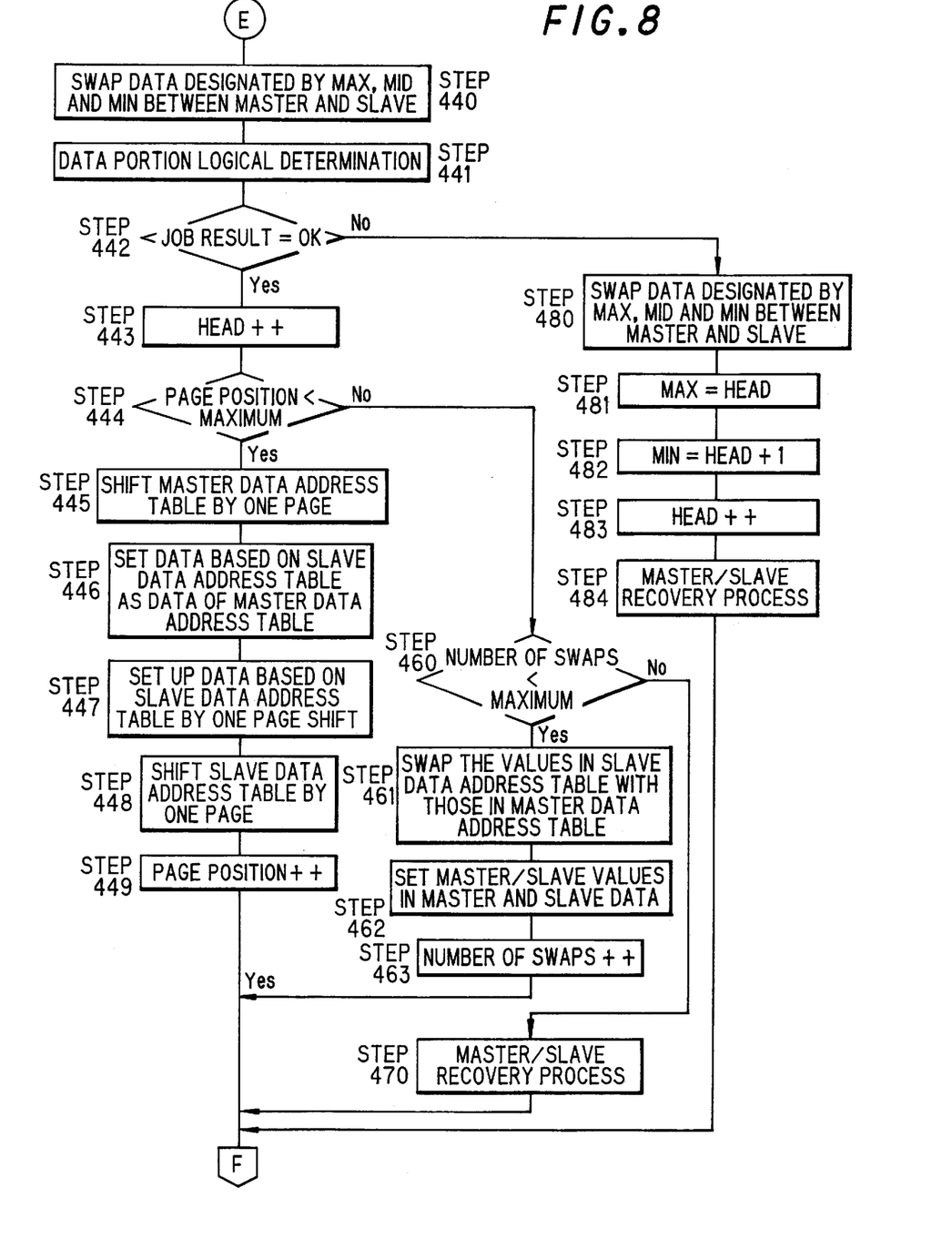

At STEP 414, during execution of the DATA portion logical determination subroutine, if the data value in the DATA portion, related to the master data address table, designated by the variable MID is anomaly, the difference of the data value in the DATA portion, related to the master data address table, designated by the variable MID from the data value in the DATA portion, related to the master data address table, designated by the variables MAX and MIN will not be equal to 1, at STEP 501 and STEP 510 (FIG. 7), the operation goes to STEP 520, where the job result is set to be NG and returns to STEP415 (FIG. 5). Then the operation jumps to STEP 440 (FIG. 8).

At STEP 440, the locations where the addresses designated by the variable MAX, MID and MIN in the master data address table are swapped with the locations where the addresses in the slave address table are stored.

Therefore, when the DATA portion logical determination subroutine is executed again at STEP 441, the addresses, in the master data address table, designated by the variables MAX, MID and MIN, present the addresses in the salve data address table. Therefore, the slave data address table can be used as the master to thereby execute the DATA portion logical determination subroutine. Thus it is possible to check if there is any contradiction as to the interrelation in the DATA portion based on the slave data address table. When the job result is found to be OK at STEP 442, the operation goes to STEP 443 from which a correcting process of the DATA portion is executed.

In this correcting process of the DATA portion, the page position storing the machine-status data in master flash memory 11 is changed. First, at STEP 443, the page position 23 related to the master and slave data address tables are incremented. Then, at STEP 444, it is judged whether the page position 23concerned the master data address table is smaller than the maximum value.

The operation goes to STEP 445 if it is smaller than the maximum value; otherwise the operation goes to STEP 460. In this example, the page position value is assumed to be smaller than the maximum value. The case where the page position value exceeds the maximum value will be described later. This maximum value depends upon the number of pages to which the machine-status data in the backup memory shown in FIG. 2 is stored.

At STEP 445, each address in the master data address table is shifted by one page.

At STEP 446, all the HEAD portion and DATA portion related to the salve data address table are set into the corresponding HEAD portion and DATA portion related to the master data address table. This allows the machine-status data in master flash memory 11 to take over the error-free data on the slave side.

Next, at STEP 447, each address in the slave data address table is shifted by one page.

At STEP 448, all the HEAD portion and DATA portion corresponding to the salve data address table before one-page shift are set up into a new page related to the same table.

Thereafter, at STEP 449, the values of page position 23 shown in FIG. 2, in master flash memory 11 and slave flash memory 12 are incremented to complete the correcting process of the slave flash memory which accompanies the correction of the master flash memory.

As stated heretofore, in a case where some machine-status data in the backup memory presents an anomaly value, it is possible to transfer the use area in the backup memory to another area to thereby prevent the repetition of the same anomaly. However, the number of transfer of the use area to another inside the backup memory has a limit. Therefore, it is necessary to have a method of dealing with the situation when the use area reaches the final page in the backup memory. Referring now to FIG. 8, the description will be made on the procedural steps after STEP 460 for handling the case where an anomaly value arises in the backup memory when the use area has reached the final page in the backup memory. This process starts when the page position 23 shown in the master data address table is judged to be equal to or greater than the final page number at STEP 444 (FIG. 8).

At STEP 460, it is judged whether the number of swaps 22 in the master data is smaller than its maximum. When the value is smaller than the maximum, the operation goes to STEP 461. When the value is equal to or greater than the maximum, the operation goes to STEP 470. In this example, it is assumed that the value is smaller than the maximum, so that the operation goes to STEP 461. The case of the number of swaps being greater than the maximum will be described later.

At STEP 461, the addresses in the master data address table is swapped with those in the slave data address table, so that the access to the master and slave sides for data read/write operations thereafter will be made oppositely.

At STEP 462, the master/slave value in the master data is set at 1 while the master slave value in the slave data is set at 0. This setting enables the above swapping between the master and slave sides to be taken over if the power to the apparatus is turned off after this.

At STEP 463, the values of the number of swaps 22 as the master and slave data are incremented to complete this process. This enables the limiting action on swapping between the master and slave sides.

Next, description will be made of a case where the apparatus was deactivated immediately after the above state and then has been restarted.

Description of STEPs 301 to 303 is omitted because they are of a typical case and the same as the above description.

At STEP 304, the master/slave value 20 in the master flash memory 11 loaded at STEP 303 presents other than 0 since master/slave swapping has once occurred. So the operation goes to STEP 310 (FIG. 4).

At STEP 310, the master/slave value 20 in the slave flash memory 12 is read and the value is determined at STEP 311. If it is 0, the operation goes to STEP 312. Otherwise the operation goes to STEP 320. Because of the transaction at STEP 462 (FIG. 8), the master/slave value 20 in slave flash memory 12 is 0. Accordingly, the operation goes to STEP 312, where the variable SWAP is set at 1. Then at STEP 306 in FIG. 3 where the variable SWAP is checked, the operation jumps to STEP 330.

At STEP 330, the addresses of the components (the master/slave value, the number of recovery, the number of swaps, the page position) in slave flash memory 12 are set into the master data address table. At STEP 331, the address of each component (the master/slave value, the number of recovery, the number of swaps, the page position) in master flash memory 11 is set into the slave data address table. By this operation, the addresses after the swapping between the master data address table and slave data address table as variables are established so that the machine-status data will be renewed without any consciousness of the fact that master/slave swapping has been done.

In this way, it is possible to easily swap the backup memories on the master and slave sides. Frequent occurrences of this swapping operation, however, leads to unreliability of the backup memory. To deal with such a situation, in this example, if the number of the occurrences of master/slave swapping in the backup memory exceeds a certain level, the backup memory will be activated. That is, a process of restoring the reliability is carried out when the number of swaps 22 in the master data address table reaches the maximum value at STEP 460 (FIG. 8). This will be described next. In this embodiment, although not particularly specified, it is possible to execute the aftermentioned process based on the number of times of the master/slave swapping of the backup memory during a certain period of time. In this example, the recovery process should be performed based merely on the number of swaps after the apparatus was first used.

Figure 9:
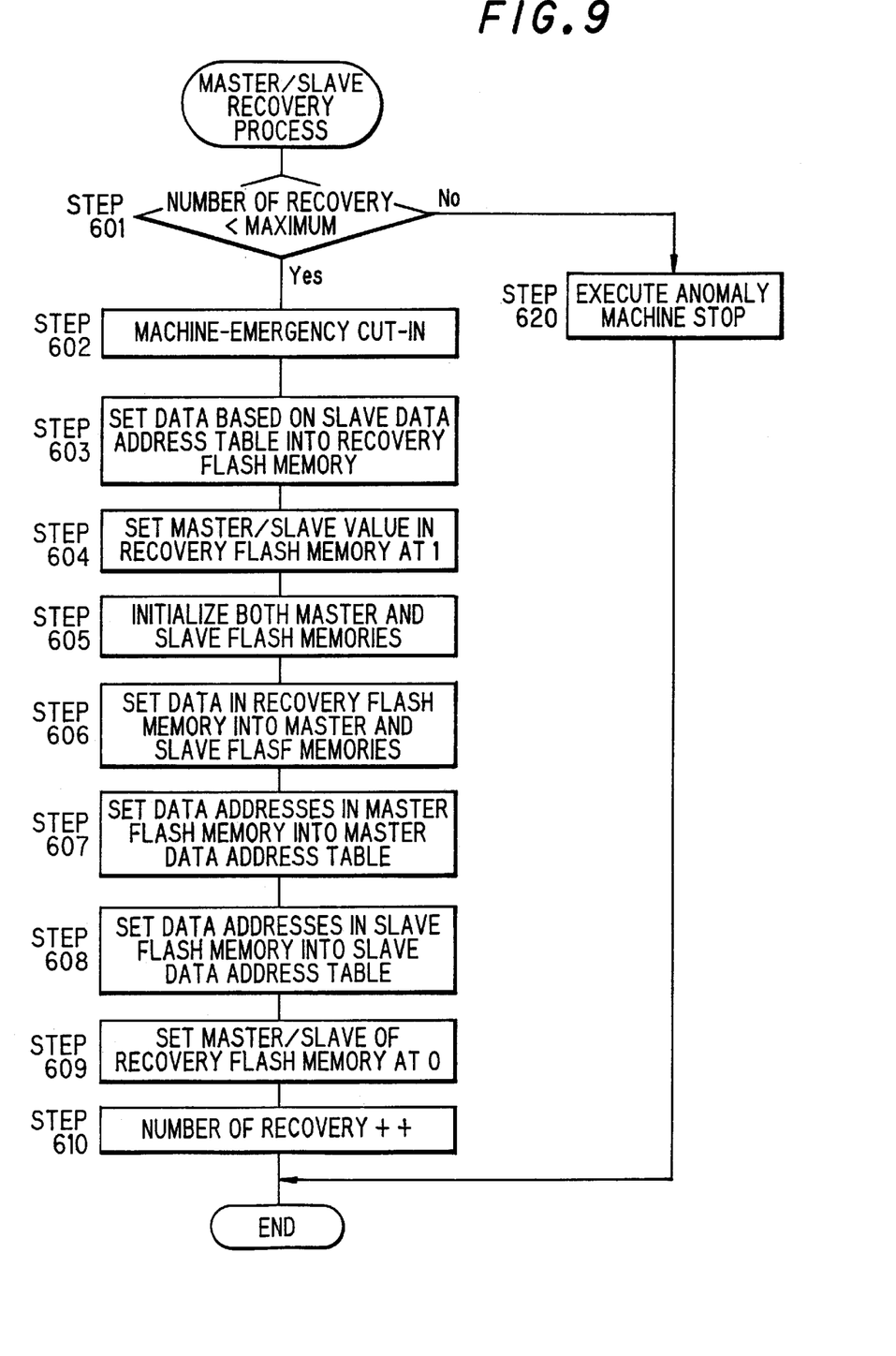
FIG. 9 is a flowchart showing a recovery process for a dual backup memory configuration.

At STEP 470, a master/slave recovery subroutine is carried out, and the operation goes to STEP 601 shown in FIG. 9. At STEP 601, it is judged whether the number of recovery 21 in the master data is smaller than its maximum value. If the judgment if affirmative, the operation goes to STEP 602. Otherwise, the operation goes to STEP 620. In this example, it is assumed that the number of recovery is smaller than the maximum, so that the operation goes to STEP 620. The case of the number of recover being equal to or greater than the maximum will be described later.

At STEP 602, machine-emergency cut-in is executed. This machine-emergency cut-in is a procedure of informing the user of the machine being effecting an emergency process and limiting the user's control on the apparatus. For example, the apparatus ignores the input through control portion 5 shown in FIG. 1 and displays the information that indicates that the emergency cut-in procedure is being executed and causes informing portion 7 to produce an alarming sound.

Next, at STEP 603, the each piece of data (the number of prints, machine usage information data, machine condition data and accounting information data) corresponding to the slave data address table is set into recovery flash memory 13. At STEP 604, the master/slave value 20 of recovery flash memory 13 is set at 1. This master/slave value 20 in recovery flash memory 13, differing from those of the other backup memories, has the function of a mask flag for the recovery process. That is, when the apparatus is shut down by the operator during the recovery process, as will be described in Example 3 hereinbelow, or when the apparatus is shut down or due to service interruption, this flag provides the information that the recovery process has been carried out halfway when the apparatus is restarted and is used for checking the occurrence of such an event.

At STEP 605, master flash memory 11 and slave flash memory 12 are initialized so that they can be activated.

At STEP 606, the set data stored at STEP 603 into recovery flash memory 13 is used to recover master flash memory 11 and slave flash memory 12. In practice, recovery is performed only for locations corresponding to page '0' in the master and slave flash memories.

At STEP 607, the address of each component in master flash memory 11 is set into the master data address table. At STEP 608, the address of each component in slave flash memory 12 is set into the slave data address table. These steps are needed upon recovery in order to adjust the page position in each backup memory.

At STEP 609, the master/slave value 20 set at 1 at STEP 604 in recovery flash memory 13 is reverted to 0, so that the apparatus will not restart the recovery process if the machine is shut down by the user from this time on.

At STEP 610, the number of recovery 21 shown in the master data is incremented to complete the recovery subroutine. This makes it possible to realize abnormal stop at STEP 601, based on the number of occurrences of the recovery process.

If the above recovery process has been executed many times, the number of recovery 21 in the master data reaches or exceeds the maximum value at STEP 601 and the operation goes to STEP 620.

At STEP 620, anomaly machine stop is executed. This anomaly machine stop is a procedure which is almost the same as the machine-emergency cut-in at STEP 602. The difference is in that the apparatus executes no recovery process and displays the fact that the machine needs hardware maintenance on, for example, the display portion shown in FIG. 1 or cause informing portion 7 to produce an alarm sound. Further, the anomaly machine stop prohibits the apparatus from starting until the backup memories are replaced, so as to prevent overwriting of the history of the machine-status data in the backup memory.

The above description heretofore has been made on the assumption of a case where the data in slave flash memory 12 is analyzed when the machine-status data in master flash memory 11 presents anomalies and the normal analysis result is obtained. Next, description will be made of a case where the analysis result of slave flash memory 12 in the above situation also presents anomalies as in the master side. That is, the job result is found to be NG at STEP 442 (FIG. 8), the operation jumps to STEP 480. This will be described next.

At STEP 480 in FIG. 8, the procedure at STEP 440 of swapping the locations of the addresses stored in the variables MAX, MID and MIN in the master data address table, with the locations of the addresses stored in the slave address table is performed again so that the variables are reverted back to their original condition. In this example, the reversion to the original condition is effected. However, this reverting procedure of the variables MAX, MID and MIN at STEP 480 can be omitted if new variables are set at STEP 440 to be used for the following procedures.

At STEPs 481 and 482, based on the value of HEAD portion 24 based on the master data address table the data designated by the variables MAX and MIN in the master and slave data address tables, are renewed. This is done for establish correct interrelation between the check elements, i.e., the variable MIN which will be the variable MAX in the next cycle, the variable MAX which will be the variable MID in the next cycle and the value of HEAD portion 24 based on the master data, to thereby disallow the current abnormal operation to affect the following operations.

In this example, anomaly values are corrected based on the value of HEAD portion 24 based on the master data. However, when even HEAD portion 24 is affected by hardware defects, the value cannot be reliable any more. Therefore, it is preferred that the interrelations between each any two of HEAD portion 24, variables MAX, MID and MIN are determined to thereby establish correct interrelation between the check elements for the next cycle, i.e., the variables MAX, MIN and HEAD portion 24. The detail is omitted in the description herein.

Accordingly, at STEP 481 (FIG. 8), the DATA portions designated by the variable MAX in the master and slave data address tables are set with the value of HEAD portion 24 based on the master data. Similarly, at STEP 482, the DATA portions designated by the variable MIN based on the master and slave data address tables are set with the incremented value of the value of HEAD portion 24 based on the master data. At STEP483, the value of HEAD portions 24 based on the master and slave address table are incremented. By these procedures, it is possible to correctly interrelate the value of HEAD portion 24 with the value of DATA portion.

Next, at STEP 484, the master/slave recovery subroutine (also as done at STEP 470) is executed to complete the process.

In this way, though the HEAD portion 24 based on the master data and the DATA portions designated by the variables MAX and MID in the master and slave data address tables are interrelated with each other from STEP 480 to 483, the recovery process of the backup memory is repeated. Because it can be considered that there is a high chance of a hardware defect occurring if the backup memories on both the master and slave sides present anomalies at the same time, the recovery process should be executed so as to activate each backup memory and thereby prevent an anomaly operation from occurring in subsequent procedures.

EXAMPLE 3

This example is the case which has not been described in either Example 1 or 2. That is, the description hereinbelow illustrates a continuation process of the recovery process needed after an event that the apparatus was shut down by the user or by any other reason during the recovery process of the backup memory.

The master/slave value 20 is loaded from recovery flash memory 13 at STEP 301 (FIG. 3) as soon as the apparatus is turned on. It is judged whether this value is equal to 0 at STEP 302. This master/slave value 20 is set at 1 at STEP 604 (FIG. 9) only. More specifically, the operation jumps from STEP 302 to STEP 340 (FIG. 4) only when the apparatus was deactivated by the user during the execution from STEP 604 to STEP 609 and then has been restarted.

The data in the recovery flash memory 13 is duplicated into master flash memory 11 at STEP 340 and into slave flash memory 12 at STEP 341. At STEP 342, the master/slave value 20 of master flash memory 11 is set at 0. At STEP 343, the master/slave value 20 of slave flash memory 12 is set at 1. This completes the continuation process needed after the recovery process of each backup memory.

The completion of a series of the recovery process is followed by STEP 344 where the master/slave value 20 of recovery flash memory 13 is set at 0. By this setting, the operation will go from STEP 302 to STEP 303 at the next power activation.

Figure 3:
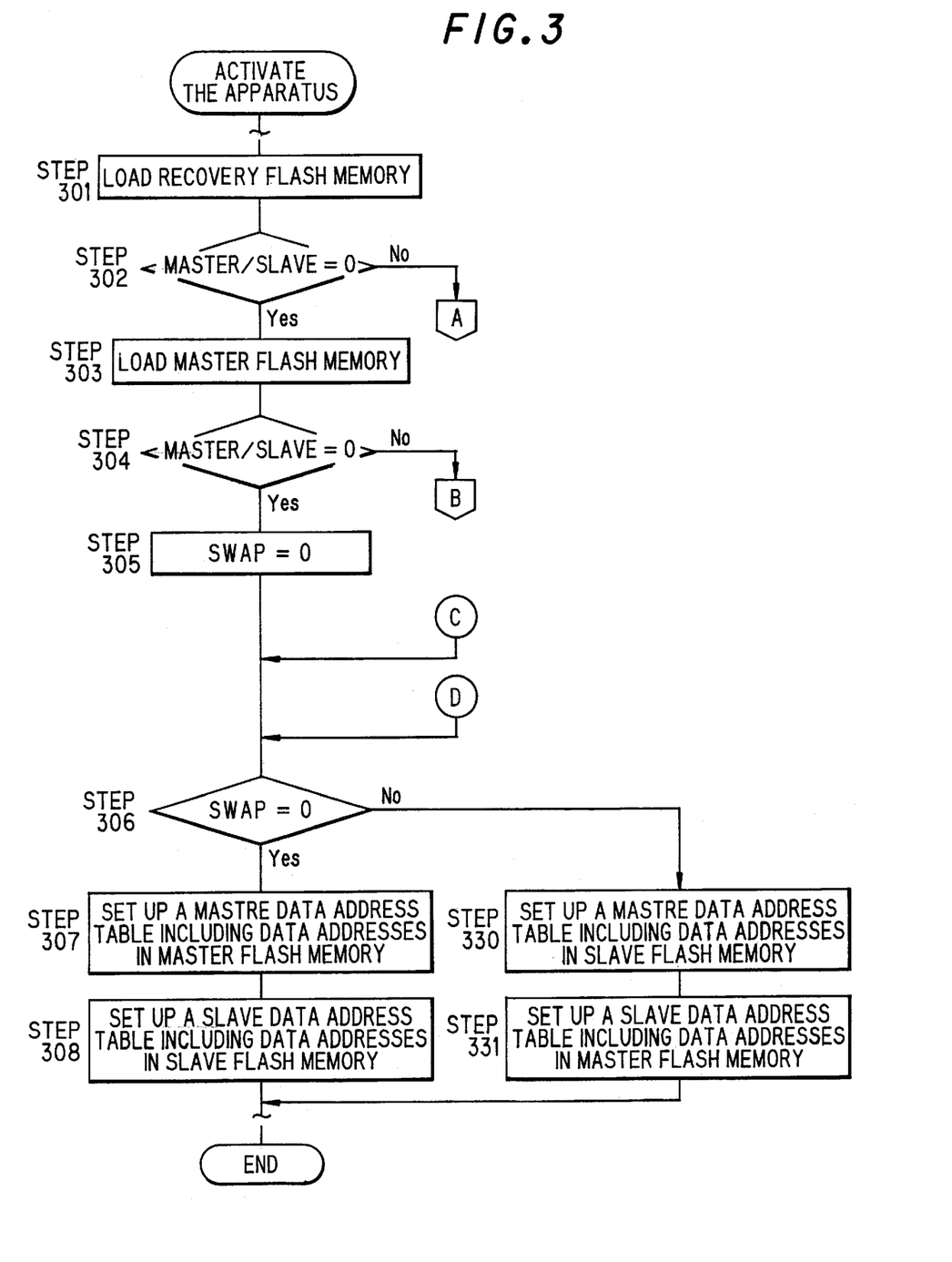
Figure 4:
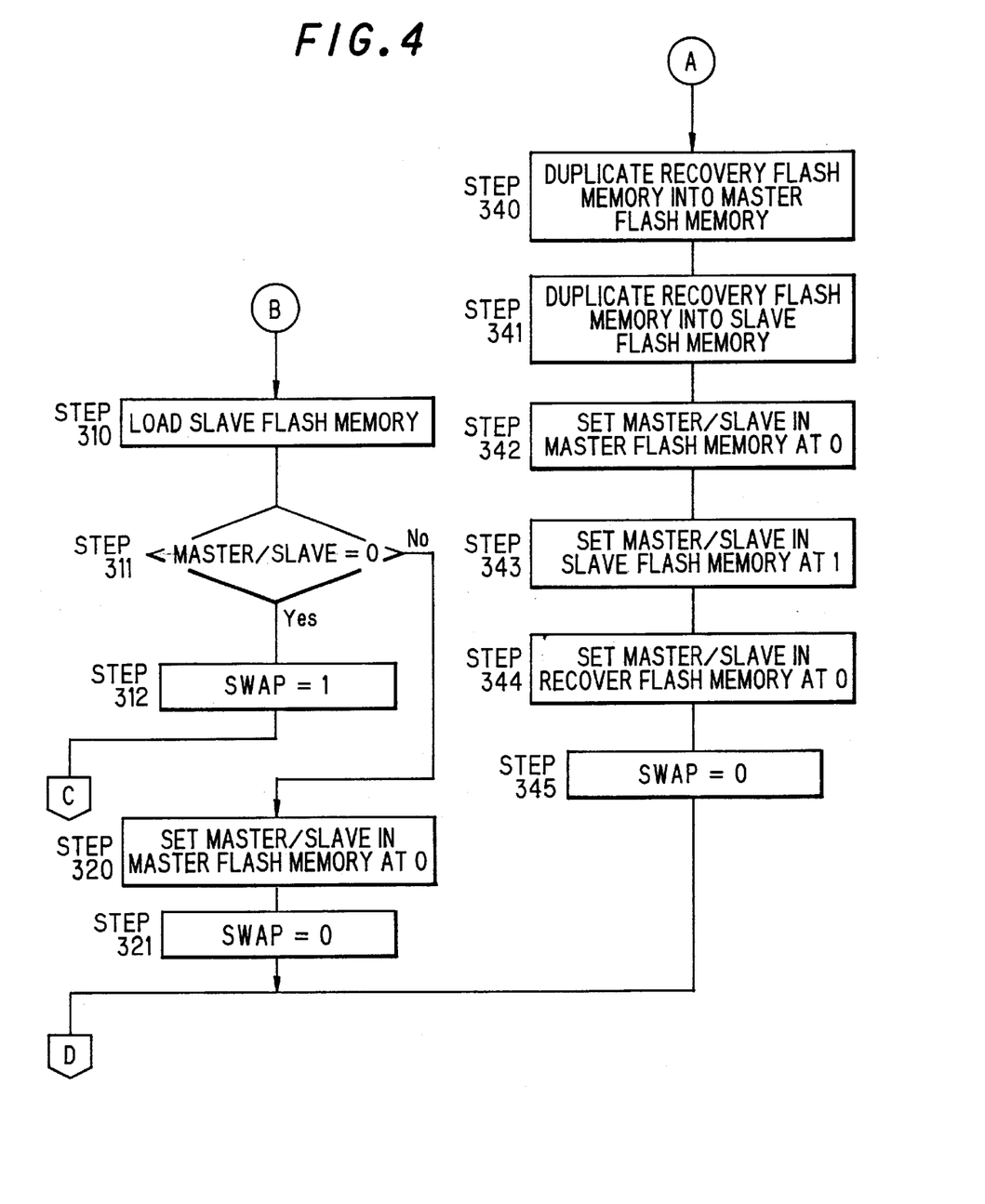

Next, at STEP 345 the variable SWAP is set at 0 for the judgement at STEP 306 (FIG. 3). That is, the process is ended so that master flash memory 11 and slave flash memory 12 will be handled respectively as the master side at STEP 307 and the slave side at STEP 308 and in the operations thereafter.

In accordance with the first feature of the present invention, plural number of data stored in one of divided memory areas in a backup memory are adapted to have a specific interrelation with one another. Thereby, if certain machine-status data presents an anomaly value due to a hardware defect or other reasons, it is possible to renew the machine-status data based on a normal value, instead of renewing the machine-status data based on the anomaly value. Therefore, it is possible to easily improve the reliability in using the backup memory.

In accordance with the second feature of the present invention, the backup memory employs flash ROMs or flash EEPROMs. Therefore, it is possible to provide a highly reliable backup memory with easiness and lower cost.

In accordance with the third feature of the present invention, the renewal of the machine-status data in the backup memory is performed when the operation of the sensor or the like arranged in the apparatus is started or ended. Therefore, it is possible to apply the method to an existing apparatus without the necessity of any special trigger information.

In accordance with the fourth feature of the present invention, since the backup memory is provided with a dual configuration, if a hardware defect occurs in one of the backup memory devices, the backup memory can operate normally without erasing the history of the machine-status data, etc. As a result it is possible to provide a high reliability.

In accordance with the fifth feature of the present invention, even when a contradiction occurs in the data in the backup memory, the machine-status data can be renewed without being affected by the data involving the contradiction. Therefore, it is possible to realize a high reliability, taking into account an unexpected case such a hardware defect or the like.

In accordance with the sixth feature of the present invention, if a contradiction occurs in the backup memory managed by a dual configuration, the machine-status data can be renewed in a different manner depending upon the level of the contradiction. Therefore, it is possible to realize a defect recovering process by inhibiting the master/slave swapping in a dual configuration from occurring as much as possible.

In accordance with the seventh feature of the present invention, an anomaly in that the first interrelation of the associated data in the backup memory does not meet the requirements can be corrected in the early stages. Therefore, it is possible to prevent a secondary failure due to the anomaly while reducing the number of processing steps in renewing the machine-status data.

In accordance with the eighth feature of the present invention, a contradiction, if any, in the backup memory is corrected only when the anomaly should be necessarily corrected. Therefore, the number of processing steps when a contradiction occurs can be reduced so that it is possible to recover the defect due to the contradiction in the early stages.

In accordance with the ninth feature of the present invention, if an anomaly occurs in the backup memory, the machine-status data area in the backup memory is switched to another area taking into account the level of the hardware defect. Therefore, if there is a hardware defect occurring in the memory, the above configuration allows the use of the memory other than the hardware defective area, thus making possible efficient use of the backup memory.

In accordance with the tenth feature of the present invention, if anomalies in the backup memory due to hardware defects have occurred repeatedly, the backup memory is initialized to activate the performance thereof without destroying the data in the backup memory. Therefore, it is possible to eliminate manpower required for recovery of the backup memory as well as reducing the time required for the recovery. In this way, the apparatus is restored instantaneously, leading to enhancement of the apparatus' operation rate. Further, since the display member makes a warning to the user during execution of the recovery process, it is possible to prevent the apparatus from being shut down during the recovery process.

In accordance with the eleventh feature of the present invention, if initializations of the backup memory due to hardware defects have occurred repeatedly, the operation of the apparatus is stopped while the display member or the like informs the user of the current situation. In this way, upon deterioration of the backup memory due to aging or when an anomaly occurs in a related device of the backup memory, the current situation is maintained before the anomalies of the machine-status data grow up. Thereby, it is possible to eliminate occurrence of errors of important machine-status data such as accounting information etc., and enhance the reliability of the apparatus. Further, the user can recognize the necessity of maintenance instantaneously, so that it is possible to recover the machine from an anomaly state when the anomaly remains in the early stages.

What is claimed is:

1. A data management method for backup memory storing machine-status data for use in an image forming apparatus comprising the steps of:
   determining a first interrelation between a first machine-status data stored most lately in a first storage area stored latest and machine-status data stored in storage area other than the first storage area when the machine-status data in a predetermined plural number of storage areas in the memory is renewed in a sequential order;
   determining a renewal machine-status data based on the first machine-status data if said first interrelation satisfies a predetermined condition; and
   storing said renewal machine-status data in the storage area to be renewed.

2. The data management method for backup memory according to claim 1, wherein the backup memory employs flash ROMs or EEPROMs.

3. The data management method for backup memory according to claim 1, wherein the machine-status data is renewed when each portion associated with machine-status data provided in the image forming apparatus starts or ends its operation.

4. The data management method for backup memory according to claim 1, wherein the backup memory has two types, master and slave memories so as to perform dual storage of the same machine-status data.

5. The data management method for backup memory according to claim 1, further comprising the steps of:
   determining that an anomaly is occurring in the first storage area when said first interrelation does not satisfy the predetermined condition;
   further determining the first interrelation of between a second machine-status data stored in second storage area before the first machine-status data is stored in the first storage area and machine-status data stored in storage area other than the first and second storage areas;
   determining a renewal machine-status data based on the second machine-status data if said first interrelation satisfies a predetermined condition; and
   storing said renewal machine-status data in the storage area to be renewed.

6. The data management method for backup memory according to claim 4, further comprising the steps of:
   loading a corresponding first interrelation from a counterpart storage area on the slave backup memory side when the first interrelation related to the storage area on the master backup memory side does not satisfy the predetermined condition;
   determining a renewal machine-status data based on a renewal relation information relating to renewal of machine-status data and storing said renewal machine-status data into storage area to be renewed on the master side if the first interrelation on the slave side also does not satisfy the predetermined condition; and
   swapping the master side and the slave side in the backup memory when the first interrelation on the slave side satisfies the predetermined condition.

7. The data management method for backup memory according to claim 5, further comprising the step of:
   correcting the first machine-status data based on the second machine-status data when it is found that the first interrelation dose not satisfy the predetermined condition.

8. The data management method for backup memory according to claims 5 or 6, wherein even when it is found that the first interrelation does not satisfy the predetermined condition, the first machine-status data that dose not satisfy the first interrelation will not be corrected as long as the first machine-status data does not need to be corrected.

9. The data management method for backup memory according to claims 5 or 6, further comprising the step of:
   switching the predetermined plural number of storage areas to another predetermined plural number of storage areas when the first interrelation does not satisfy the predetermined condition.

10. The data management method for backup memory according to claim 9, further comprising the steps of:
    when swapping of the storage areas has been repeated, a predetermined number of times during a predetermined period of time, or when swapping of the storage areas has been repeated to a predetermined number of times,
    informing the user of the current situation through a display member;

saving the machine-status data in the backup memory, into a separate, recovery backup memory;

initializing the backup memory; and recovering the backup memory using the machine-status data stored in the recovery backup memory.

11. The data management method for backup memory according to claim 10, further comprising the steps of:

when the initialization of the backup memory and the following recovery operation of the backup memory using the recovery backup memory have been repeated, a predetermined number of times during a predetermined period of time, or when the initialization of the backup memory and the following recovery operation has been repeated to a predetermined number of times, stopping the operation of the machine; and informing the user of the current situation through the display member.

* * * * *